United States Patent
Silverbrook et al.

(10) Patent No.: US 7,986,427 B2
(45) Date of Patent: *Jul. 26, 2011

(54) SYSTEM FOR COPYING INTERACTIVE DOCUMENTS

(75) Inventors: Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 86 days.

This patent is subject to a terminal disclaimer.

(21) Appl. No.: 12/475,600

(22) Filed: May 31, 2009

(65) Prior Publication Data

US 2009/0237703 A1    Sep. 24, 2009

Related U.S. Application Data

(63) Continuation of application No. 10/804,034, filed on Mar. 19, 2004, now Pat. No. 7,557,944, which is a continuation of application No. 09/693,219, filed on Oct. 20, 2000, now Pat. No. 7,110,126.

(30) Foreign Application Priority Data

Oct. 25, 1999 (AU) .................. PQ3632

(51) Int. Cl.
    *G06F 3/12*      (2006.01)
    *H04N 1/40*      (2006.01)

(52) U.S. Cl. .............. 358/1.15; 358/3.28; 358/401
(58) Field of Classification Search ........... 358/1.1, 358/1.2, 1.9, 1.11–1.18, 2.1, 3.24, 3.27, 3.28, 358/401, 403, 426.04, 426.06, 426.12, 435, 358/444, 470

See application file for complete search history.

(56) References Cited

U.S. PATENT DOCUMENTS

| | | |
|---|---|---|
| 4,864,618 A | 9/1989 | Wright et al. |
| 5,051,736 A | 9/1991 | Bennett et al. |
| 5,477,012 A | 12/1995 | Sekendur |
| 5,486,686 A | 1/1996 | Zdybel, Jr. et al. |
| 5,506,697 A | 4/1996 | Li et al. |

(Continued)

FOREIGN PATENT DOCUMENTS

EP    0621721 A    10/1994

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner* — Thierry L Pham

(57) ABSTRACT

A system is provided for copying interactive documents which has a copier for scanning a surface of a document, a computer system networked with the copier and a printer networked with the computer system. The document is printed with document content and a plurality of coded tags. Each tag encodes an identity of the document and the position of that tag on the document. The copier incorporates a sensor for sensing the coded tags. The computer system identifies a digital version of the document from the document identity of a sensed tag and determines user input, requesting copy content and/or coded data from the computer system, on the scanned document using the tag position of the sensed tag. The printer prints a copy of the scanned document to incorporate the scanned document content and coded tags and the requested copy content and/or coded data.

8 Claims, 9 Drawing Sheets

U.S. PATENT DOCUMENTS

| | | | |
|---|---|---|---|
| 5,652,412 A | 7/1997 | Lazzouni et al. | |
| 5,661,506 A | 8/1997 | Lazzouni et al. | |
| 5,684,288 A | 11/1997 | Renvall | |
| 5,692,073 A | 11/1997 | Cass | |
| 5,754,308 A * | 5/1998 | Lopresti et al. | 358/403 |
| 5,781,914 A | 7/1998 | Stork et al. | |
| 5,852,434 A | 12/1998 | Sekendur | |
| 5,880,727 A | 3/1999 | Barrett et al. | |
| 6,076,734 A | 6/2000 | Dougherty et al. | |
| 6,137,590 A | 10/2000 | Mori | |
| 6,282,312 B1 | 8/2001 | McCarthy et al. | |
| 6,330,976 B1 * | 12/2001 | Dymetman et al. | 235/487 |
| 6,537,324 B1 | 3/2003 | Tabata et al. | |
| 6,964,374 B1 | 11/2005 | Djuknic et al. | |
| 2001/0010195 A1 | 8/2001 | Kessler | |
| 2001/0040685 A1 | 11/2001 | Winter et al. | |

FOREIGN PATENT DOCUMENTS

| | | |
|---|---|---|
| EP | 0833276 A2 | 4/1998 |
| GB | 2306669 A | 5/1997 |
| JP | 08-256256 | 10/1996 |
| JP | 10-151821 | 6/1998 |
| JP | 10-224540 | 8/1998 |
| JP | 10-228468 | 8/1998 |
| JP | 11-352598 | 12/1999 |
| WO | WO 98/15917 A1 | 4/1998 |
| WO | WO 99/18487 A2 | 4/1999 |
| WO | WO 99/19823 A | 4/1999 |
| WO | WO 99/50787 A1 | 10/1999 |

* cited by examiner

SYSTEM FOR COPYING INTERACTIVE DOCUMENTS

CROSS REFERENCES TO RELATED APPLICATIONS

The present application is a continuation of U.S. application Ser. No. 10/804,034 filed Mar. 19, 2004, now issued U.S. Pat. No. 7,557,944, which is a continuation of U.S. application Ser. No. 09/693,219 filed on Oct. 20, 2000, now issued as U.S. Pat. No. 7,110,126 all of which are herein incorporated by reference.

FIELD OF INVENTION

The present invention relates generally to the fields of document retrieval and generation, facsimile reproduction, document imaging, photocopying, and archiving. More particularly, it concerns a method and system for enabling the copying of documents. It has specific application to the archiving and retrieval, and the scanning and reproduction of documents which are or which may be capable of interacting with a computer system.

CO-PENDING APPLICATIONS

Various methods, systems and apparatus relating to the present invention are disclosed in the following co-pending applications filed by the applicant or assignee of the present invention simultaneously with U.S. Pat. No. 7,110,126:

| | | | | | |
|---|---|---|---|---|---|
| 7,190,474 | 7,110,126 | 6,813,558 | 6,965,454 | 6,847,883 | 7,131,058 |
| 09/693,690 | 6,982,798 | 6,474,888 | 6,627,870 | 6,724,374 | 7,369,265 |
| 6,454,482 | 6,808,330 | 6,527,365 | 6,474,773 | 6,550,997 | |

The disclosures of these co-pending applications are incorporated herein by cross-reference.

Various methods, systems and apparatus relating to the present invention are disclosed in the following co-pending applications filed by the applicant or assignee of the present invention on 15 Sep. 2000:

| | | | |
|---|---|---|---|
| 6,679,420 | 6,963,845 | 6,995,859 | 6,720,985 |

The disclosures of these co-pending applications are incorporated herein by cross-reference.

Various methods, systems and apparatus relating to the present invention are disclosed in the following co-pending applications filed by the applicant or assignee of the present invention on 30 Jun. 2000:

| | | | | | |
|---|---|---|---|---|---|
| 6,824,044 | 6,678,499 | 6,976,220 | 6,976,035 | 6,766,942 | 7,286,113 |
| 6,922,779 | 6,978,019 | 7,406,445 | 6,959,298 | 6,973,450 | 7,150,404 |
| 6,965,882 | 7,233,924 | 7,007,851 | 6,957,921 | 6,457,883 | 6,831,682 |
| 6,977,751 | 6,398,332 | 6,394,573 | 6,622,923 | | |

The disclosures of these co-pending applications are incorporated herein by cross-reference.

Various methods, systems and apparatus relating to the present invention are disclosed in the following co-pending applications filed by the applicant or assignee of the present invention on 23 May 2000:

| | | | | |
|---|---|---|---|---|
| 6,428,133 | 6,315,399 | 6,338,548 | 6,540,319 | 6,328,431 |
| 6,328,425 | 6,991,320 | 6,383,833 | 6,464,332 | 6,390,591 |
| 7,018,016 | 6,328,417 | 09/575,197 | 7,079,712 | 6,825,945 |
| 7,330,974 | 6,813,039 | 6,987,506 | 7,038,797 | 6,980,318 |
| 6,816,274 | 7,102,772 | 7,350,236 | 6,681,045 | 6,728,000 |
| 7,173,722 | 7,088,459 | 09/575,181 | 7,068,382 | 7,062,651 |
| 6,789,194 | 6,789,191 | 6,644,642 | 6,502,614 | 6,622,999 |
| 6,669,385 | 6,549,935 | 6,987,573 | 6,727,996 | 6,591,884 |
| 6,439,706 | 6,760,119 | 7,295,332 | 6,290,349 | 6,428,155 |
| 6,785,016 | 6,870,966 | 6,822,639 | 6,737,591 | 7,055,739 |
| 7,233,320 | 6,830,196 | 6,832,717 | 6,957,768 | 7,456,820 |
| 7,170,499 | 7,106,888 | 7,123,239 | 6,409,323 | 6,281,912 |
| 6,604,810 | 6,318,920 | 6,488,422 | 6,795,215 | 7,154,638 |
| 6,859,289 | 6,527,365 | | | |

The disclosures of these co-pending applications are incorporated herein by cross-reference.

BACKGROUND

Modern advanced photocopying apparatus are extremely sophisticated, and machines currently available are able to produce very high quality images and provide a great variety of functions. In basic terms, such a machine comprises a high quality scanner and a high quality printer, in combination with a dedicated computer operable in response to user input commands and preset protocols. In common with the most basic photocopying equipment, though, a problem remains that deterioration of copy quality will inevitably occur as successive generations of copies are made from an original document.

SUMMARY OF INVENTION

It is an objective of the present invention to provide a method and system for enabling copying of documents.

It is an objective of the present invention to provide a new system and method for enabling the copying of documents.

According to the invention in a first aspect, there is provided a method enabling the copying of documents, the method including the steps of:

scanning a document which may contain both document information and coded data indicative of an identity of the document, and forming a digital image of the document;

detecting, if the document contains said coded data indicative of the identity of the document, the coded data;

if the document contains said coded data indicative of the identity of the document, accessing stored data representing the content of the document; and printing a copy of the document and, at the same time, printing on the copy coded data indicative of an identity of the copy.

According to the invention in a second aspect, there is provided a method enabling the copying of documents, the method including the steps of:

scanning a document which may contain both document information and coded data indicative of an identity of the document, and forming a digital image of the document;

detecting, if the document contains said coded data indicative of the identity of the document, the coded data;

if the document contains said coded data indicative of the identity of the document, accessing stored data representing the content of the document; and storing data representing a copy of the document, the stored data including a unique identifier for said copy.

According to the invention in a third aspect, there is provided a system enabling the copying of documents, including:

a scanner for scanning a document which may contain both document information and coded data indicative of an identity of the document and enabling formation of a digital image of the document;

a detector for detecting, if the document contains said coded data indicative of the identity of the document, the coded data;

a data store representing document content, accessible if the document contains said coded data indicative of the identity of the document; and a printer adapted for printing a copy of the document and, at the same time, printing on the copy coded data indicative of an identity of the copy.

According to the invention in a fourth aspect, there is provided a system enabling the copying of documents, including:

a scanner for scanning a document which may contain both document information and coded data indicative of an identity of the document and enabling formation of a digital image of the document;

a detector for detecting, if the document contains said coded data indicative of the identity of the document, the coded data;

a first data store representing document content, accessible if the document contains said coded data indicative of the identity of the document; and a second data store for storing data representing a copy of the document, together with a unique identifier for the copy.

If a document is scanned on which no coded data is detected, the user may be given the option simply to print a copy of the digital image of the document, without any coded data on the copy. Stored data representing the copy will still include a unique identifier for that copy, to enable retrieval if required. Preferably, of course, every outputted copy from the copier of the invention will include coded data identifying the copy, to enable retrieval by way of that copy.

In a preferred form, to take advantage of the full potential functionality of the present invention, the coded data printed on the copy is also indicative of a plurality of reference points on the copy, the coded data being printed to be readable by a sensing device operated by a user in order to identify the position of the sensing device relative to the copy. This enables the copy to be truly interactive, as, by selecting a certain zone on the copy with the sensing device, the user is able to instruct the computer system to select, say, an object according to the stored data associated with that zone on the copy.

The printed copy may include information derived either from the scanned digital image of the document, or from the stored data representing the content of the document, or from both. Optionally, if the document is found to contain coded data indicative of the identity of the document and the stored data representing the content of the document is accessed, the stored data and the digital image can be compared to determine if the document contains additional or omitted document information, when compared with the stored data. The operator may be presented with an option as to whether the copy includes the additional or omitted information.

Accordingly, then, the present invention provides a method and system which is able to copy and/or to produce and/or to reproduce one or more interactive forms capable of interacting with a computer system. Such a concept may be used in conjunction with a single computer, but it is preferably adapted to operate over a computer network, such as the Internet. In this way, the system and method of the invention allows, say, a user in one location to feed a document into a scanner, and input a copy command for that document, a copy of that document being archived or printed to a second user at a remote location.

Physically, the form is disposed on a surface medium which may be of any suitable structure. However, in a preferred embodiment, the form is disposed on sheet material such as paper or the like which has the coded data printed on it and which allows interaction with the computer system. The coded data is detectable preferably, but not exclusively, outside the visible spectrum, thereby enabling it to be machine-readable but substantially invisible to the human eye. The form may also include visible material which provides information to a user, such as the application or purpose of the form, and which visible information may be registered or correlate in position with the relevant hidden coded data.

The system also includes a sensing device to convey data from the form to the computer system, and in some instances, to contribute additional data. Again, the sensing device may take a variety of forms but is preferably compact and easily portable. In a particularly preferred arrangement, the sensing device is configured as a pen which is designed to be able to physically mark the interactive form as well as to selectively enable the coded data from the form to be read and transmitted to the computer system. The coded data then provides control information, configured such that designation thereof by a user causes instructions to be applied to the software running on the computer system or network.

The nature of the interaction between the form and the sensing device and the data that each contributes to the computer system may vary. In one arrangement, the coded data on the form is indicative of the identity of the form and of at least one reference point on that form. In another embodiment, the interactive form includes coded data which is indicative of a parameter of the form, whereas the sensing device is operative to provide data regarding its own movement relative to that form to the computer system together with coded data from the form. In yet another arrangement, the form includes the coded data which at least identifies the form, and the sensing device is designed to provide, to the computer system, data based on the form coded data, and also on data which identifies the user of the device.

In a preferred arrangement, the system and method also employs specially designed printers to print the interactive form. Further these printers constitute or form part of the computer system and are designed to receive data from the sensing device. As indicated above, the system and method of the invention is ideally suited to operate over a network. In this arrangement, the printers are fully integrated into the network and allow for printing of the interactive forms on demand and also for distributing of the forms using a mixture of multicast and pointcast communication protocols.

Accordingly, in a preferred form, the present invention provides methods and systems which use a paper and pen based interface for a computer system. This provides many significant benefits over traditional computer systems. The advantage of paper is that it is widely used to display and record information. Further, printed information is easier to read than information displayed on a computer screen. Moreover, paper does not run on batteries, can be read in bright light, or robustly accepts coffee spills or the like and is portable and disposable. Furthermore, the system allows for hand-drawing and handwriting to be captured which affords greater richness of expression than input via a computer keyboard and mouse.

BRIEF DESCRIPTION OF DRAWINGS

Preferred and other embodiments of the invention will now be described, by way of non-limiting example only, with reference to the accompanying drawings, in which.

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular applications U.S. Ser. No. 09/575,129, U.S. Ser. No. 09/575,174, U.S. Ser. No. 09/575,155, U.S. Ser. No. 09/575,195 and U.S. Ser. No. 09/575,141. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
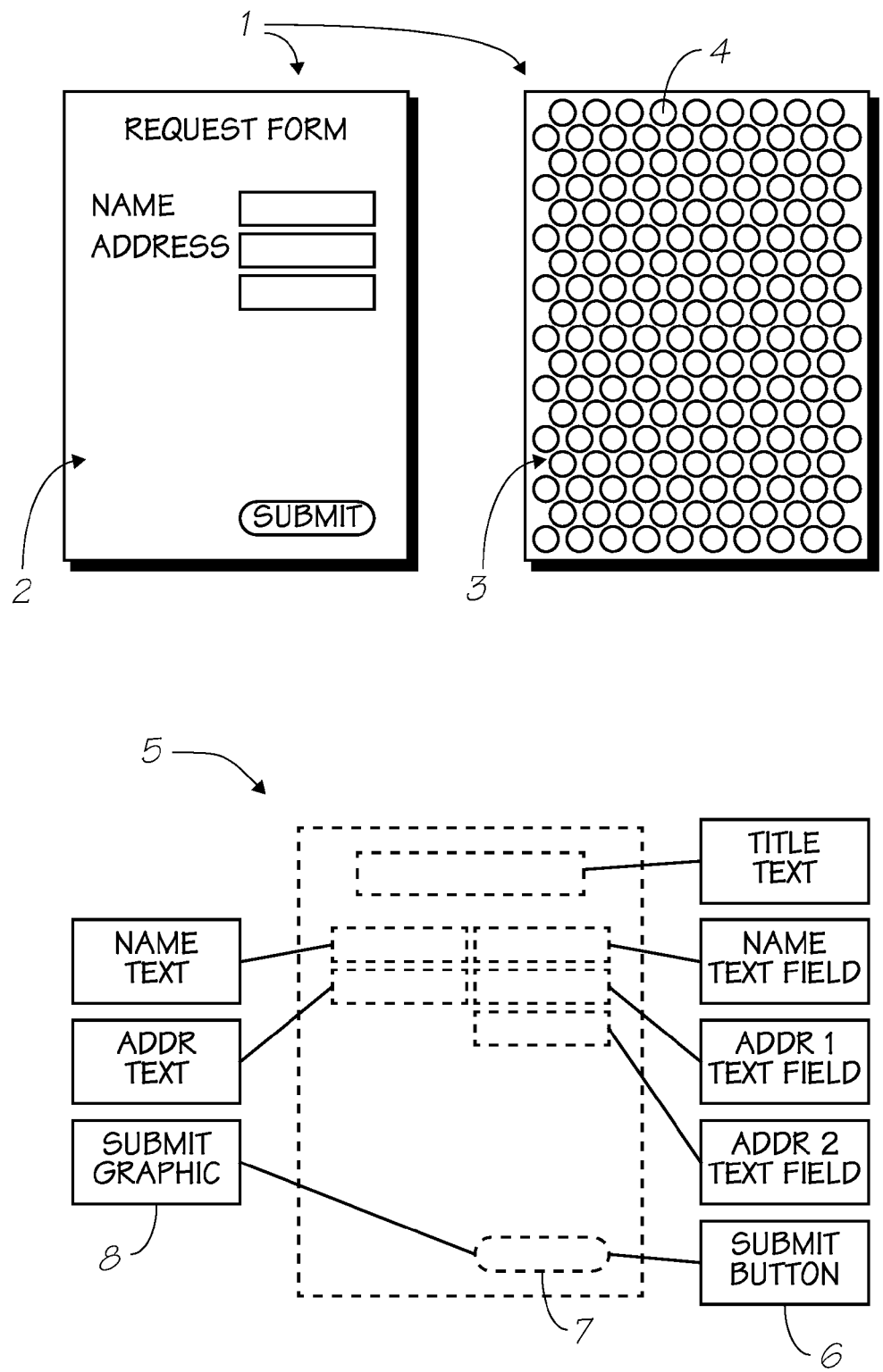
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
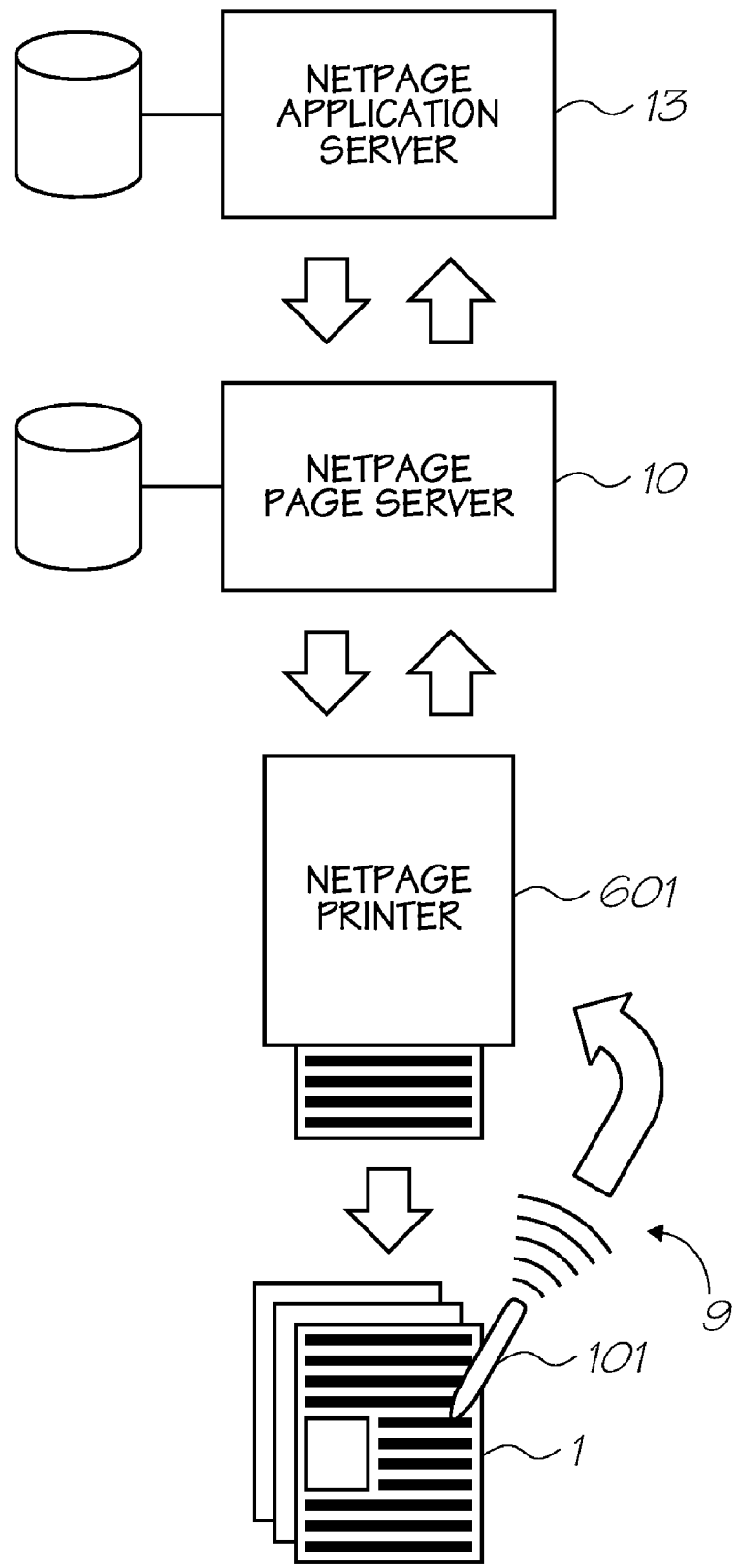
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier application U.S. Ser. No. 09/575,155 and our co-filed application U.S. Ser. No. 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our earlier application U.S. Ser. No. 09/575,141. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
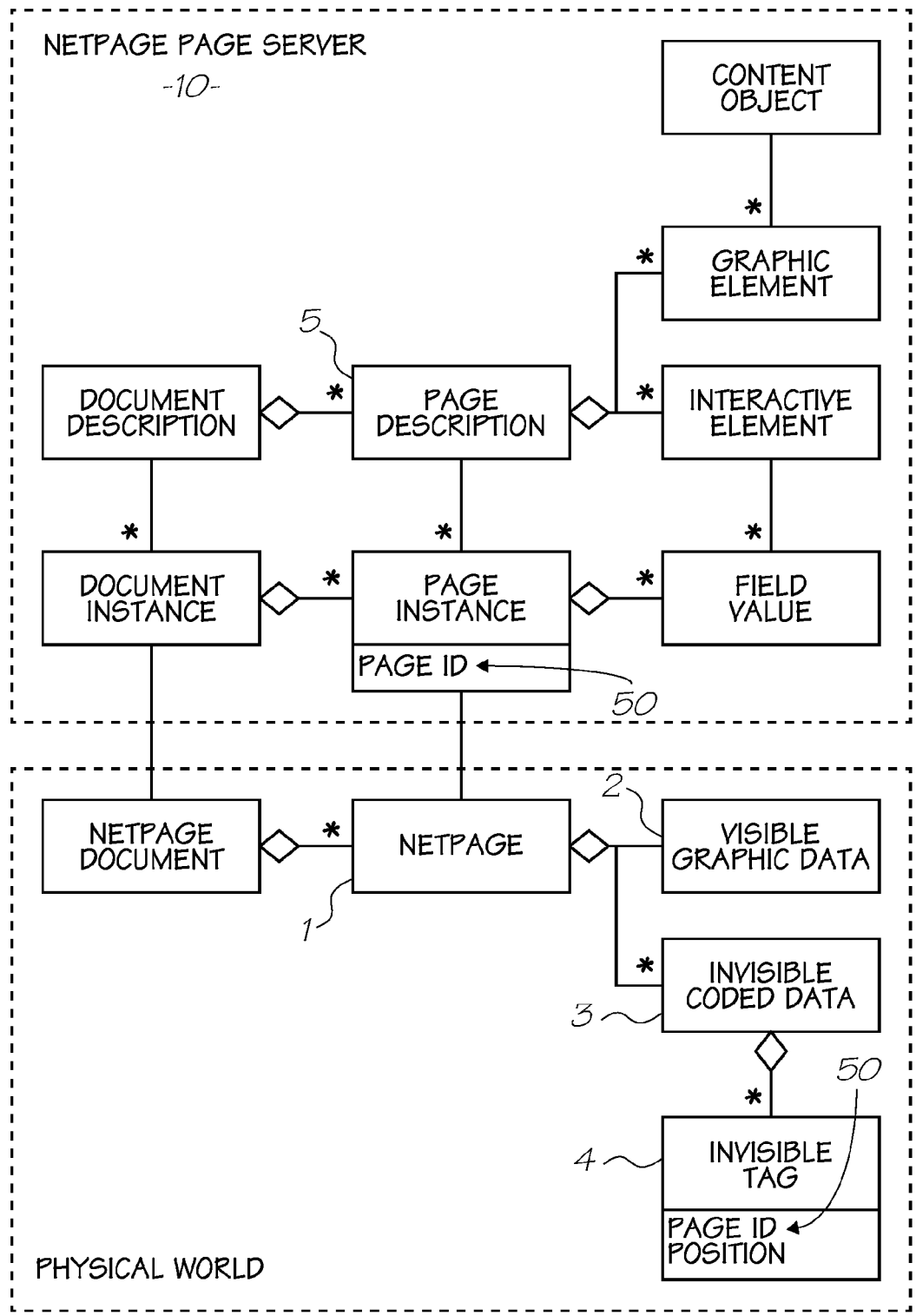
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows 290 ($\sim 10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
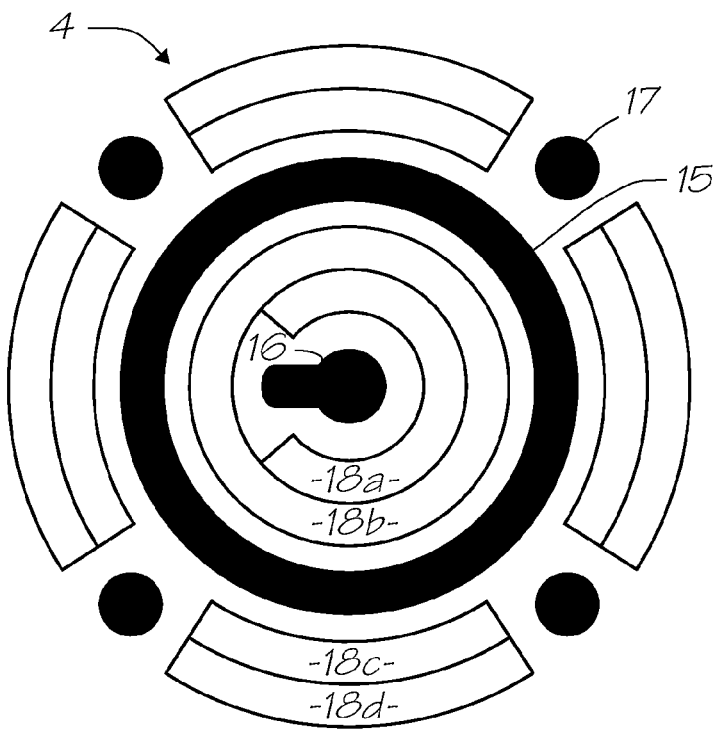
FIG. 4A is a plan view showing a structure of a netpage tag.

One embodiment of the physical representation of the tag, shown in FIG. 4a and described in our earlier application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
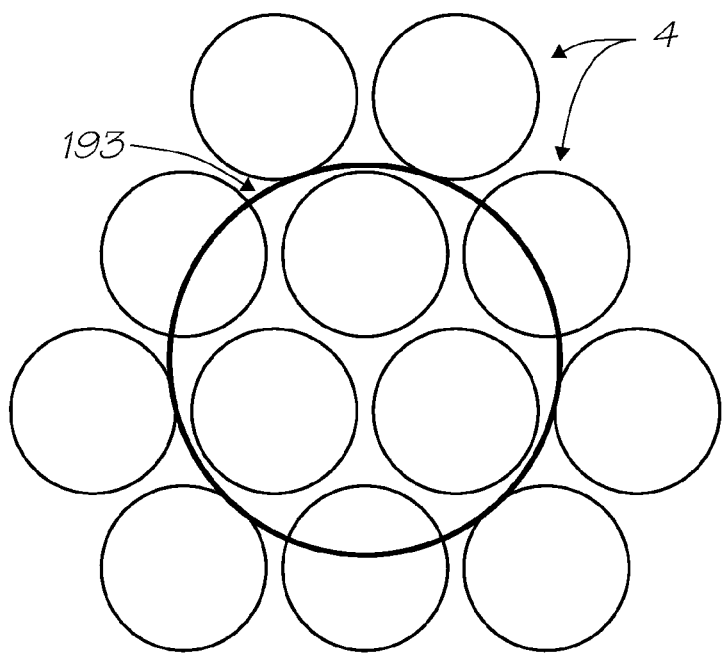
FIG. 4B is a plan view showing a relationship between a set of the tags shown in FIG. 4A and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
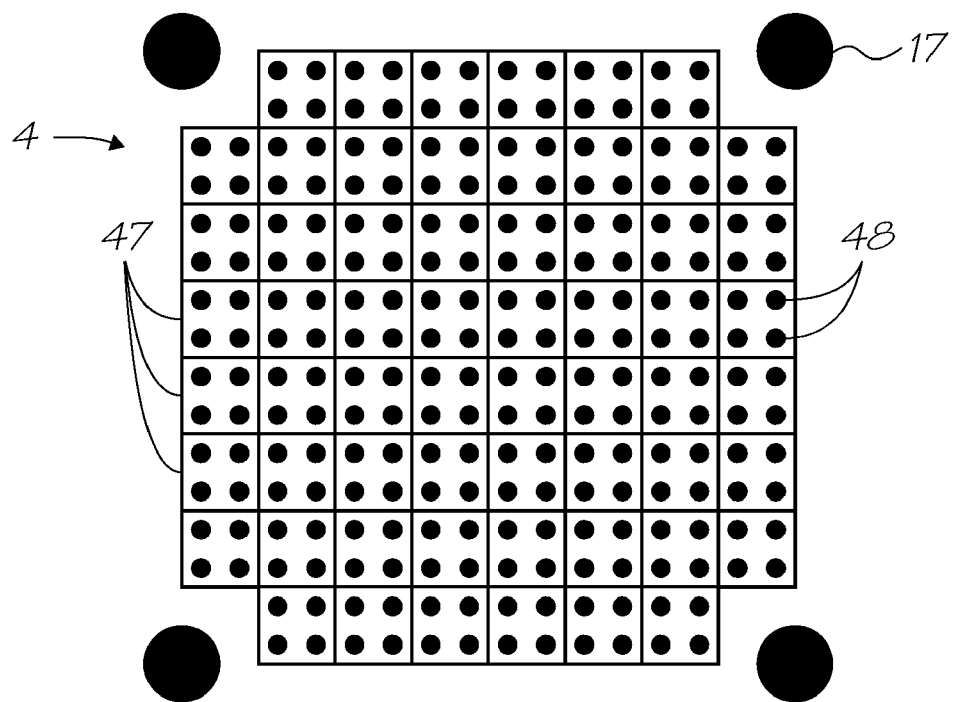
FIG. 5A is a plan view showing an alternative structure of a netpage tag.
Figure 5B:
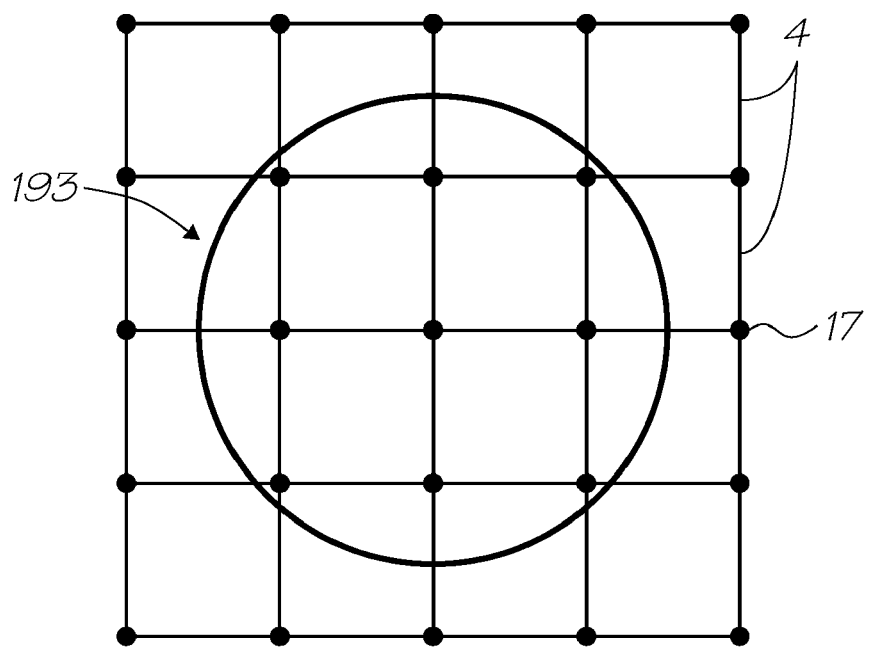
FIG. 5B is a plan view showing a relationship between a set of the tags shown in FIG. 5a and a field of view of a netpage sensing device in the form of a netpage pen.
Figures 5C, 5D:
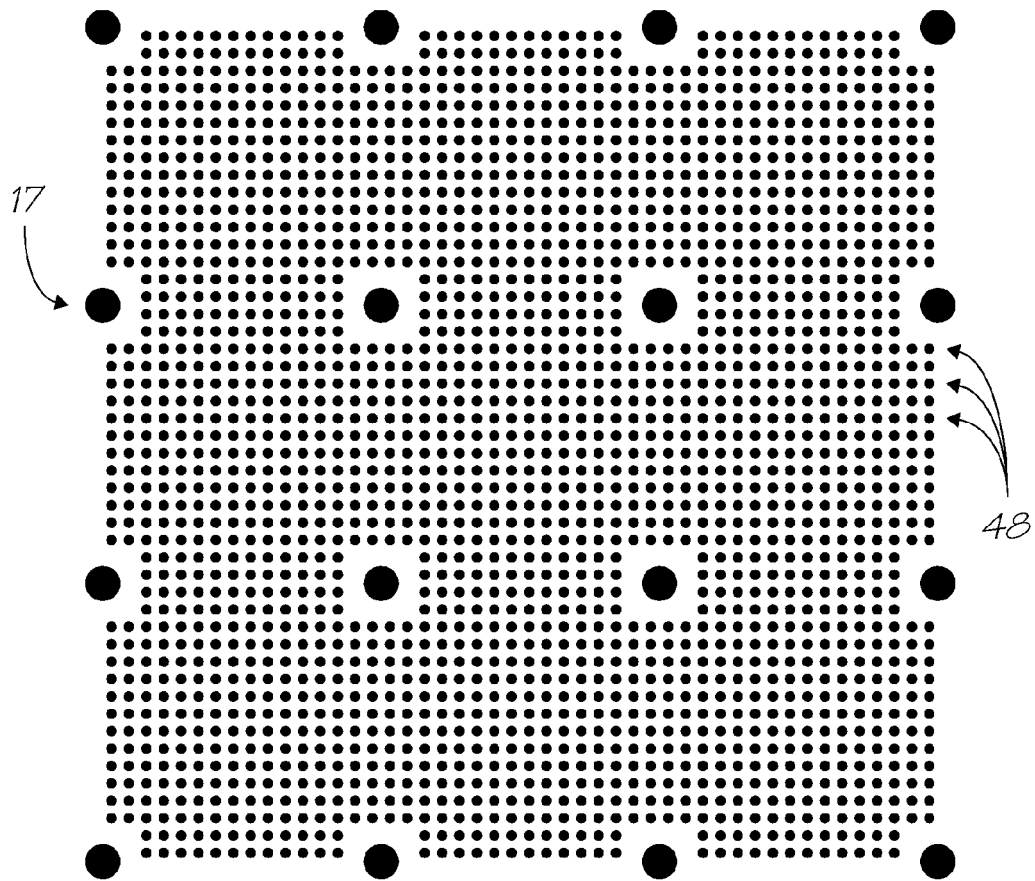
FIG. 5C is a plan view showing an arrangement of nine of the tags shown in FIG. 5A where targets are shared between adjacent tags.
FIG. 5D is a plan view showing the interleaving and rotation of the symbols of the four codewords of the tag shown in FIG. 5A.

An alternative tag structure more suited to a regular tiling is shown in FIG. 5a. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known.

This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded Cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Ser. No. 09/575,174.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

The Netpage Copier

The netpage copier is a digital "photocopier" which incorporates a page scanner and a netpage printer. Its mode of operation depends on the kind of input page(s) supplied by the user and the kind of output page(s) requested by the user. As input, the user can supply an ordinary page, an ordinary document, or a netpage bearing coded information. As output, the user can request an ordinary page, an ordinary document, a coded netpage, or a coded netpage document. The copier may incorporate a binding mechanism, in which case it is able on request to bind printed documents.

For the purposes of identifying an input netpage, the copier incorporates a netpage sensor, as described in further detail below.

Typically, the netpage copier is also able to operate as a normal netpage printer, ie. for printing netpages in response to commands from the netpage system, and as a netpage base station, ie. for relaying netpage pen input to the netpage system.

Copying Ordinary Pages

When instructed to produce a netpage copy of an ordinary page, the copier scans the page, archives the digital page image in the netpage system, and then prints the page image as a netpage. The resulting printed netpage is coded with the page id of the archived page image, allowing the printed netpage to act as the source of a digital copy of the page, eg. for the purposes of obtaining another printed copy of the page. The printed netpage is also coded with location ids, allowing portions of the page to be selected, using a netpage pen or other suitable sensing device, and copied into other applications etc. Various netpage copy mechanisms are described above, and described further in our earlier application U.S. Ser. No. 09/663,640.

The netpage system optionally performs optical character recognition (OCR) on the content of the scanned page, allowing the content of the page to be indexed and therefore subsequently readily searched by the user or by other users. The copier is typically able to treat a collection of pages presented by the user at the same time as belonging to a single document, allowing the pages to be indexed either independently or as part of a single document.

The netpage system optionally adds the scanned pages and/or document to a directory of scanned pages and/or documents. If an identity of the user is known to the system (eg. via the identity of the copier, or of the netpage pen used), then the system may be arranged to record the user as the owner of the scanned pages and/or document, and the directory may be a directory associated with or linked to the user. The system may be configured such that the user is required to provide an identity by presenting an identity token, such as a smart card or a netpage sensing device, to the copier. If the user interface of the copier is provided as a netpage, then the system automatically obtains the user's identity as part of the user's interactions with the system. The copier may alternatively or additionally allow the user to enter (or select) a user name via a built-in touch-sensitive screen, via a screen and keyboard, or by way of any other appropriate means. The user may also be required to enter a password to prove his or her identity.

The printed netpage optionally contains standard netpage buttons which allow the user to obtain a printed copy of the page or even of the entire document of which the page is part. For example, one feature of the netpage system is the provision on each netpage of the netpage logo at the bottom of each page, to indicate that it is a netpage and therefore has interactive properties. The logo also acts as a copy button, in which case the 'pressing' of the 'logo button' produces a copy of the page.

The user may choose to archive scanned pages in the netpage system, for future reference, without immediately printing corresponding netpages.

Copying Netpages

When the user presents a netpage to the copier, the copier detects the fact that it is a netpage by successfully sensing a page id via a sensor means, being one or more built-in netpage sensors. The sensor means is preferably disposed so that it can scan multiple locations on the page, thus maximizing the chance of successfully sensing the page id even if the page is degraded or badly damaged. The sensor means may, for example, be mounted in association with the movable image sensor of the scanner device.

When the input page is a netpage, a number of possibilities exist. The user can request an ordinary (non-netpage) copy of the page or of the document of which the page is part, or the user can request a netpage copy of the page or of the document of which the page is part. In general, any of the full range of netpage page server commands is optionally available. These include the void form command, the duplicate form command, the get form status command, the reset form command, the duplicate page command, the reset page command, the get page status command, the duplicate document command, the reset document command, and the get document status command, described further in our earlier application U.S. Ser. No. 09/575,192.

For example, the user is able to obtain a fresh copy of a netpage form (ie. one devoid of user input) via the reset form command, and a new active copy of a form (ie. one with user input converted as appropriate) via the duplicate form command.

In general then, provided that the copier is able to sense the identity of an input netpage, it is able to produce a pristine digital copy of the page, with or without the digital ink associated with the page, even if the physical netpage is severely degraded or damaged.

By default, markings on the surface of a netpage which are not made with a netpage pen, and which are thus not known to the netpage system, are not duplicated when a netpage is copied in this way. However, since the page is also physically scanned by the image sensor, the copier can detect the presence of markings which are not part of the archived netpage, and can then optionally duplicate those markings. In this case the copier is able to compute the difference between the scanned image and a rendered image of the archived page, and can thus reproduce these differences in the copy. However, this process may reproduce unwanted artifacts such as creases and dirt, if present. If the user has requested an ordinary (non-netpage) copy of the page and the page contains non-netpage input, then the copier can also produce if required a local copy of the page, ie. one produced directly from the scanned image rather than including information from the archived netpage page description.

Non-netpage markings on a page detected by differencing can optionally be archived on the netpage system together with the archived netpage, thus making them available when subsequent copies of the page are requested in the absence of the physical original. An option can then be provided as part of the duplicate form/page/document page server commands to specify whether non-netpage markings should be included in the copy or not.

Copier Structure

Figure 6:
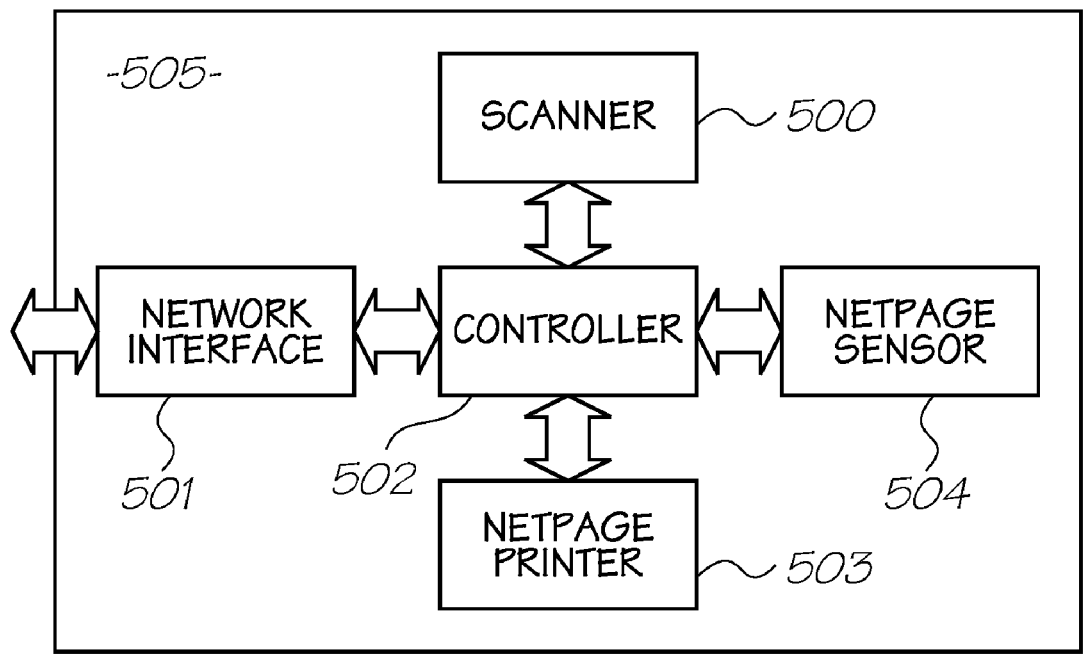
FIG. 6 schematically illustrates the interaction between components of a copier according to the present invention, the copier incorporating a printer.
Figure 7:
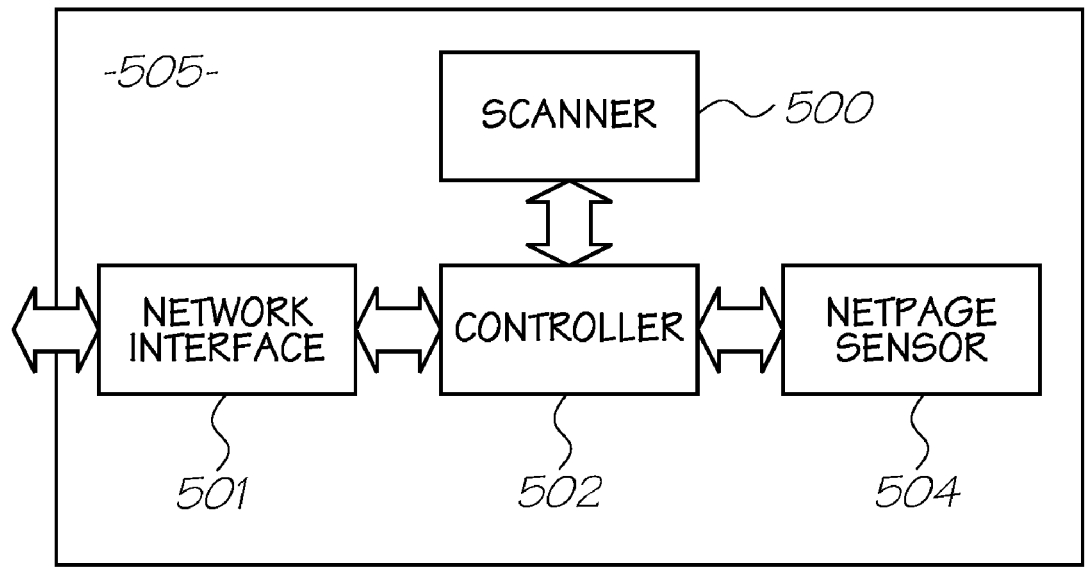
FIG. 7 schematically illustrates the interaction between the components of a copier according to the present invention, the copier not incorporating a printer.
Figure 8:
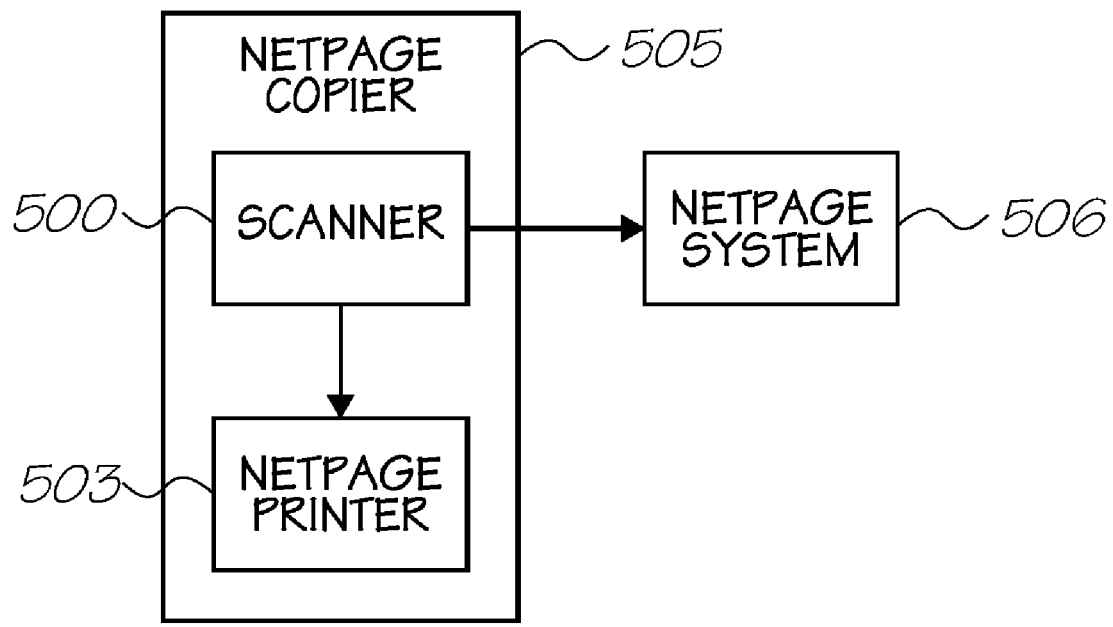
FIG. 8 schematically illustrates the interaction between the copier of FIG. 6 and the netpage system, the copier arranged to print directly to the printer.
Figure 9:
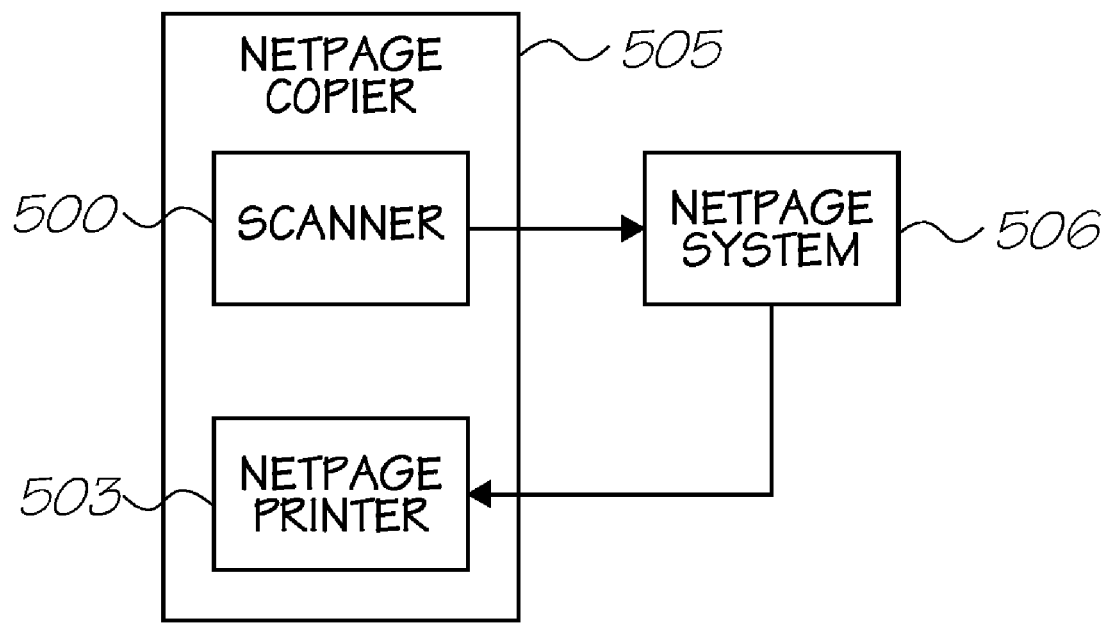
FIG. 9 schematically illustrates the interaction between the copier of FIG. 6 and the netpage system, the copier arranged to print via the netpage system.
Figure 10:
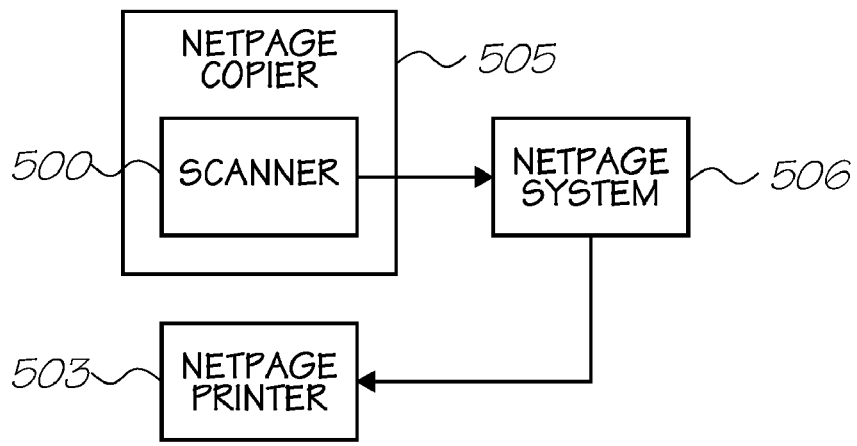
FIG. 10 schematically illustrates the interaction between the copier of FIG. 7 and the netpage system, the copier arranged to print via the netpage system.

Physically, then, the netpage copier consists of a netpage printer functionally coupled with an optical scanner. The scanner 500 and printer 503 are typically housed in the same physical unit and share the same controller 502 and network interface 501 used to communicate with the netpage network, as represented in FIG. 6. However, the scanner 500 may be physically decoupled from the printer 503, with output being directed to the printer via the netpage system 506, as represented in FIG. 10. In this case, the scanner 500 incorporates its own controller 502 and network interface 501 (see FIG. 7). When the scanner 500 and printer 503 are closely coupled, the copier 505 may print either directly or via the netpage system 506, as illustrated in, respectively, FIGS. 8 and 9.

When the scanner and printer are decoupled, the system may be configured such that the target printer is the user's default printer, or a printer previously associated with the copier.

As mentioned above, the copier may include netpage base station functionality, i.e. a wireless interface to netpage sensing devices such as pens and the like. If the copier supports "smart" copying of netpages, then it also incorporates one or more netpage sensors in the scanner, as explained above. A user interface provides the user with access to the various copying modes and functions described above.

The scanner consists of a glass platen for holding the input sheet (or other medium) while it is scanned, and a linear image sensor. The image sensor typically moves relative to the fixed platen during scanning, although the image sensor may be fixed and the platen itself may move. Alternatively, the platen may be omitted and the copier arranged to feed the page past the image sensor. The scanner optionally handles auto-feeding of multiple input sheets via a mechanism which transports each input sheet in turn from an input hopper to the platen for scanning, and then to an output hopper, in the same way as conventional photocopiers. The functionality of the output hopper and the input hopper may be provided in a single hopper, scanned sheets being physically separated from pending sheets by one or more fingers. The scanner optionally handles duplex scanning by providing for sheet reversal in the transport mechanism. Any alternative or additional functional features relating to page feeding, formatting, collating, etc. may be incorporated into the copier of the invention. Such features will not be described in further detail herein, as they will be evident to the skilled reader.

The linear image sensor is typically a red-green-blue (RGB) linear charge-coupled device (CCD), although a monochrome CCD can also be used of color reproduction is not required. Even without color scanning, when a netpage is copied, color reproduction of all but any non-netpage page markings present may be provided.

To obviate the need for a netpage sensor in the scanner, each netpage may contain a coding of its page id detectable by the scanner's optical image sensor. This may take the form of a visible barcode, for example. It may be unobtrusively hidden in the netpage logo which appears on each netpage (and which typically acts as a copy button, as explained above).

Archiving Protocol

When the copier is required to archive a scanned page or document, it obtains a document id 51 from a netpage id server 12, identifies the page server 10 which handles the allocated document id 51, and then sends the page image(s) to the page server 10 for archiving. The page server 10 allocates a page id 50 for each page, stores the page images, indexes the page images by their respective page ids and their common document id, and returns the allocated page ids to the copier for future reference. The copier may utilize the document id and/or page ids when issuing subsequent page server commands to the page server to effect operations on the pages (such as producing a printed copy).

Figure 11:
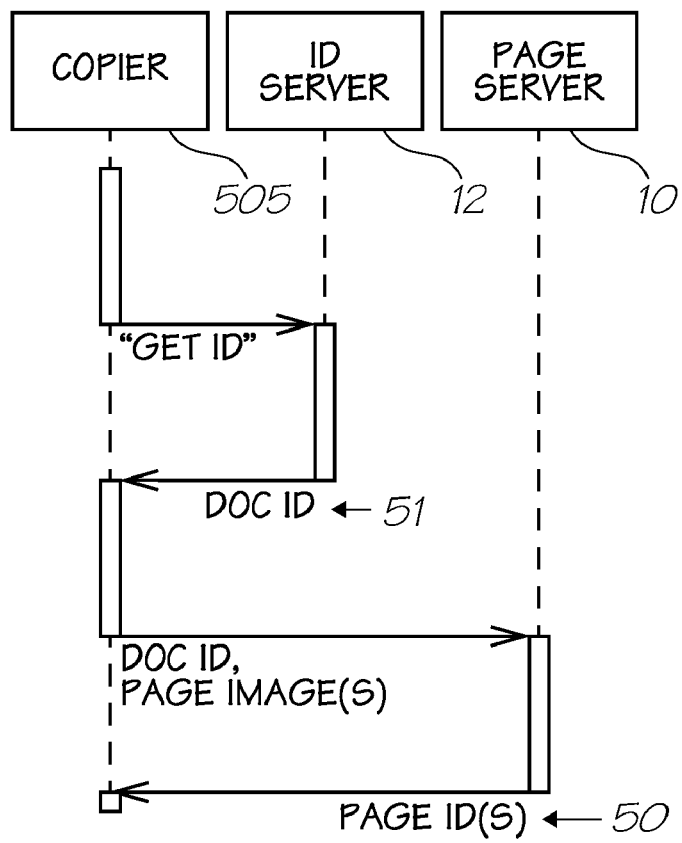
FIG. 11 illustrates a scanned page archiving protocol according to the present invention.

The copier typically transmits each page image to the page server immediately after scanning the page, to obviate the need for extensive storage in the copier. It may defer printing of a document until the entire document is scanned and archived, and this is particularly desirable if the copier consists of a scanner without a built-in printer (see FIG. 10). The archiving protocol described above is illustrated schematically in FIG. 11.

Clearly, many alternative and additional features to those described above are possible and will be evident to the skilled reader. Whilst the invention has been illustrated and described in the context of a particular example thereof, it will be appreciated by the skilled reader that it may be implemented in other ways. Furthermore, many modifications to the detailed features described may be envisaged, and it is understood that any such modifications and/or additions to the embodiment specifically described and illustrated herein may be made without departing from the spirit or scope of the invention.

The invention claimed is:

1. A system for copying interactive documents, the system comprising:
   a copier for scanning a surface of a document, the document being printed with document content and a plurality of coded tags, each tag encoding an identity of the document and the position of that tag on the document, the copier incorporating a sensor for sensing the coded tags;
   a computer system networked with the copier for identifying a digital version of the document from the document identity of a sensed tag and determining user input on the scanned document using the tag position of the sensed tag, the user input requesting copy content and/or coded data from the computer system; and
   a printer networked with the computer system for printing a copy of the scanned document incorporating said scanned document content and coded tags and the requested copy content and/or coded data.

2. A system according to claim 1 wherein the copier communicates with a server for allocating a unique identifier to each copy.

3. A system according to claim 2 wherein data indicative of said unique identifier is incorporated into said coded data and is printed in said printed copy.

4. A system according to claim 1 wherein said coded data is indicative of a plurality of reference points on said copy, the coded data being printed to be readable by a sensing device operated by a user in order to identify the position of the sensing device relative to the copy.

5. A system according to claim 1 further comprising a network interface for transmitting to the computer system second document data representing said copy of the document to enable said second document data to be stored.

6. A system according to claim 5 wherein said second document data can be retrieved through said network interface to enable reproduction of said copy with both document content and coded data.

7. A system according to claim 1, wherein the printer prints said printed copy with portions of said document content as scanned by the scanner not contained in said digital version of the document.

8. A system according to claim 1, wherein the printer is incorporated in the copier.

* * * * *